United States Patent

[11] 3,586,099

| [72] | Inventor | Stafford D. Collie<br>Kansas City, Mo. |
|---|---|---|
| [21] | Appl. No. | 880,687 |
| [22] | Filed | Nov. 28, 1969 |
| [45] | Patented | June 22, 1971 |
| [73] | Assignee | Phillips Petroleum Company |

[54] SERVING APPARATUS
4 Claims, 2 Drawing Figs.

[52] U.S. Cl. ............................................. 165/48,
165/64, 221/92, 244/118, 219/202, 219/393,
219/472, 219/217, 219/218, 297/180, 312/236
[51] Int. Cl. ............................................. F25b 29/00
[50] Field of Search ............................................. 219/393,
390, 386, 201—2, 217—18, 472—4; 165/48, 645;
221/92; 244/134, 118, 122, 141; 128/376;
297/180, 191; 312/235—6

[56] References Cited
UNITED STATES PATENTS

| 2,358,071 | 9/1944 | Hurtado | 312/236 |
|---|---|---|---|
| 2,525,952 | 10/1950 | Saterlic et al. | 312/236 |
| 2,565,769 | 8/1951 | Hatker | 219/217 |
| 2,853,205 | 9/1958 | Boyd | 219/218 |
| 3,129,317 | 4/1964 | Howard | 312/236 X |
| 3,172,713 | 3/1965 | Rupert | 221/131 X |
| 3,205,033 | 9/1965 | Stentz | 165/48 X |
| 3,521,030 | 7/1970 | Maahs | 219/202 |

*Primary Examiner*—Volodymyr Y. Mayewsky
*Attorney*—Young & Quigg

ABSTRACT: A storage and serving apparatus detachably affixed to a back of a passenger seat of a vehicle and having a plurality of compartments. The apparatus including an insulated heating compartment, an insulated cooling compartment and an insulated serving tray for closing said compartments.

PATENTED JUN22 1971  3,586,099

INVENTOR.
S.D. COLLIE
BY Young & Quigg
ATTORNEYS

SERVING APPARATUS

This invention relates to a serving apparatus. In another aspect, this invention relates to a food storage and serving apparatus.

In the past, serving of food, drinks, and many other items on common carriers, such as airlines, for example, often requires the labor of many persons. With the advent of enlarged transportation vehicles to accommodate the ever increasing population, service personnel and labor requirements will be greatly increased. For example, in the very near future airlines will be transporting in excess of 500 passengers in each aircraft and will require a large staff of stewardesses to service these passengers.

It is therefore an object of this invention to provide an apparatus for storing and automatically individually serving food and other articles to passengers. Another object of is invention is to provide an apparatus of the above-described type that will heat portions of the food contained therein and cool other portions of the food. Yet another object of this invention is to provide an apparatus of the above-described type that can be opened for access to the passengers and energized to heat and cool contents therein from a remote location. A further object of this invention is to provide an apparatus that will reduce the labor required to service passengers traveling on common carriers. Other aspects, objects, and advantages of the present invention will become apparent from a study of the disclosure, the appended claims, and the drawing.

The drawings are diagrammatic views in partial section of the apparatus of this invention.

Figure 1:
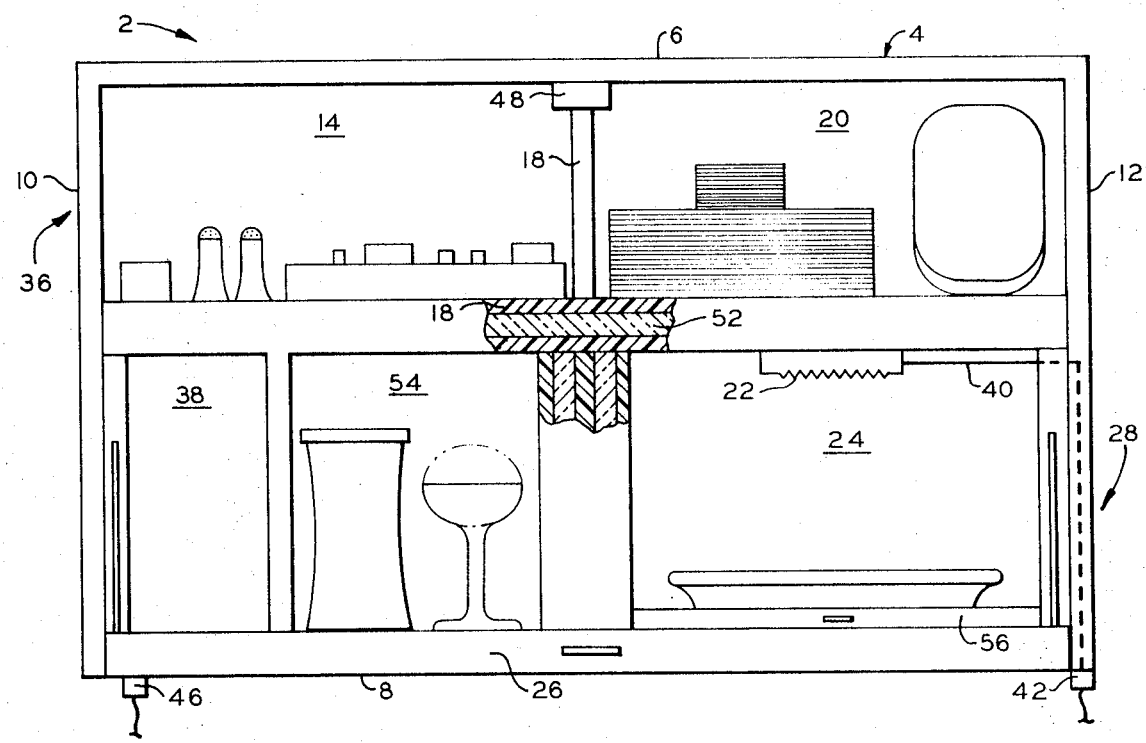
FIG. 1 shows a frontal view of the apparatus.
Figure 2:
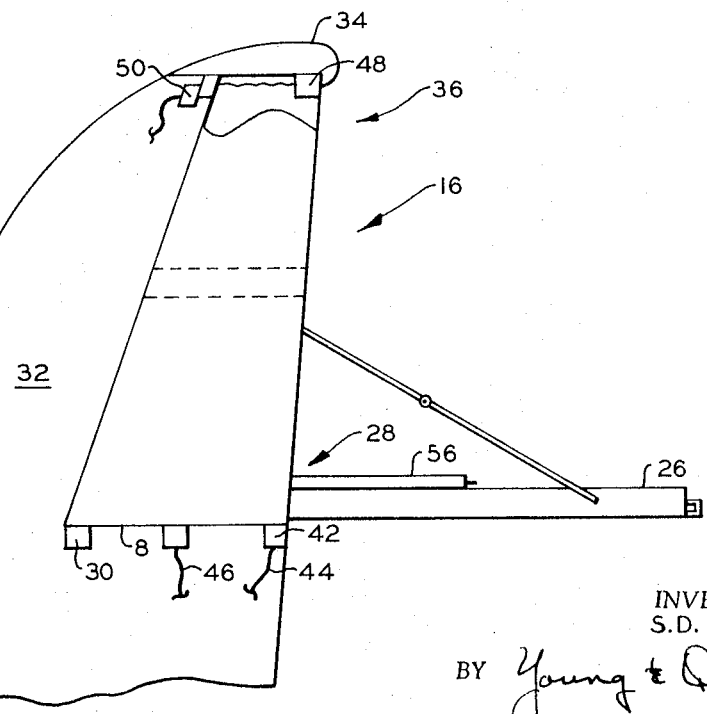
FIG. 2 shows a side view of the apparatus installed on the back f passenger seat.

Referring to FIG. 1, the storage and serving apparatus to a of this invention has a housing 4 comprising a top 6, a bottom 8, first and second sidewalls 10,12 forming a chamber 14 that is open on the front portion 16 (better seen in FIG. 2). A plurality of dividing members 18 extending vertically horizontally from the housing 4 within the chamber 14 divide said chamber into a plurality of separate compartments 20. A heating means 22 is positioned within at least one of the compartments to provide a heating zone that will hereafter be referred to as heating compartment 24. A serving tray 26 is hingedly connected, for example, to a lower portion 28 of the housing 4 for movement between a first position at which the tray extends laterally and substantially horizontally outwardly from the lower portion 28 of the housing 4 and a second position at which the tray 26 is covering the front portion 16 of the housing 4 and sealing the chamber 14. The housing 4 can be formed of one or more materials such as acrylonitrile butadiene styrene (ABS), polyethylene, polypropylene, fiber glass, nylon, polyphenylene sulfide, polyvinyl chloride and the like or can be constructed of metal. Preferably for use in aircraft, the housing 4 should be constructed to be as lightweight as possible and yet be sufficiently sturdy to withstand relatively severe impacts during handling. In the alternative, the apparatus can be constructed having light weight and of materials that are relatively inexpensive and therefore can be disposed of after a few uses.

The outside configuration of the housing 4 is dependent upon the type of seats used in the vehicle within which this apparatus is to be utilized. FIG. 2 shows one example of how the apparatus can be attached to the back of a passenger seat. Here the apparatus 2 slips into a recessed portion of the seat back 32 and is maintained in that position by inserting a lower holding lug 30 of the apparatus 2 into lug recess formed in the seat and pivoting a latch 34 of the seat back 32 into contact with upper portion 36 of the housing 4. Other attachment means known in the art can also be utilized.

It is important, however, that mounting of the apparatus the seat back causes a remote power source (not shown) to be operably connected to the apparatus for supplying power to the heating means 22 and sometimes to a cooling means 38. For example, the heating means 22 of this invention can be an electric heating element having an electric line 40 with a plug means 42 positioned on an outer portion of the housing at a location which is adjacent and in contact with the seat back 32 in the mounted position and is automatically connected to the power source during attachment of the apparatus to the passenger seat. Attachment of the power source to the plug means 42 is, for example, by inserting a male plug part into a female plug part, one part of which is mounted on the seat back and has an electric line 44 connecting the seat's plug part to the power source. By so constructing the apparatus in this manner and having a switch control panel at a central location, a stewardess, for example, can energize the heating means 22 at a desired time and heat food or other articles contained within the heating compartment 24 of the apparatus 2. Similar plug means 46 and controls as described above can be connected to a cooling means 38 such as a refrigeration unit for cooling food or other articles contained therein.

In order that control can be maintained over the passengers in regard to serving time, it is preferred that the serving tray 26 has a lock 48, an electric lock for example, for releasing the tray for movement from the second to the first position upon receiving a signal from a remote location. The lock 48 can be connected to a signal means or power source and controlled from a control panel by constructing plug means 50 and associated equipment similar to that described for the heating and cooling means 22, 38.

It should be understood that other heating and cooling means 22, 38 can be utilized with the apparatus 2 of this invention. Examples of heating and cooling means other than those that are electrically operated are hot packs containing preheated liquid or solids that are placed in heating compartment 24 at the time it is serviced and prior to placement in the vehicle and dry ice or other frozen liquids or solids can be placed in the space provided for cooling means 38.

Insulating material 52 such as, for example, fiber glass, rock wool, foamed plastics, asbestos, and the like should be mounted on the walls of the heating and cooling compartments 24, 54 in order to reduce the power needed to maintain that particular compartment at a desired temperature. A separate closing element 56 can be provided for the heating and cooling compartments 24,54 or the tray 26 can be an insulated tray and constructed to tightly seal said compartments 24,54 when the tray 26 is at the second position.

It should also be understood that the arrangement and relative positions of the various compartments 20,24,54 of the apparatus 2 can be altered without departing from this invention.

In the operation of the apparatus of this invention, the apparatus containing, for example, food, blankets, pillows, and other items that are desired be serviced to the passengers is mounted on a seat back prior to departure of the vehicle. Mounting said apparatus completes electrical circuit for associated elements as described above At that time or later these elements can be activated as desired. An example operation would be to activate the cooling element to maintain the cooling compartment and articles contained therein at a low temperature and later activate the heating element at a time near the serving moment. At the food serving moment, one stewardess, for example, can signal all or a portion of the locking means 48 to release thereby permitting the passengers access to the contents contained within the apparatus. The control panel can also be constructed to permit individual opening of the apparatus so, for example, a magazine, pillow, or blanket can be obtained by a passenger.

The apparatus of this invention is particularly more useful where individual communication systems connect each passenger with an individual operator at a controlled location near the control panel. Requests for various items by the passenger can thereby be communicated to the operator and the operator can thereafter unlock the serving apparatus and relock said apparatus after said passenger has obtained the requested item.

By installing the apparatus of this invention and loading said apparatus with all the items to be serviced to passengers of the carrier, an individual operator can attend the requests of a multitude of passengers with the expenditure of considerably less labor.

Other modifications and alterations of this invention will become apparent to those skilled in the art from the foregoing discussion and accompanying drawing, and it should be understood that this invention is not to be unduly limited thereto.

What I claim is:

1. A storage and serving apparatus detachably affixed to a back of a passenger seat, comprising:
   a frame having a top, a bottom, a backwall, and first and second sidewalls forming a chamber open on the front portion and being removably attached within the space of the back of the passenger seat with said walls and said sidewalls in contact with the seat;
   a serving tray connected to lower portion of the housing for movement between a first position at which the tray extends laterally and substantially horizontally outwardly from the lower portion of the housing and a second position at which the tray is covering the front portion of the housing and sealing the chamber;
   a plurality of dividing members extending laterally from the frame within the chamber to divide said chamber into a plurality of compartments;
   an electric heating element within at least one of the compartments for providing a heating compartment within the apparatus;
   said electric heating element having an electric line with a plug means positioned on the outer portion of the housing for automatically connecting the heating element to a power source during attachment of the apparatus to the passenger seat; and
   an insulating material within the compartment having the heating element therein and an insulated closing element for covering and sealing the frontal portion of the heating compartment.

2. An apparatus, as set forth in claim 1, including at least a second insulated compartment; and an insulated closing element for covering and sealing the frontal portion of the second insulated compartment.

3. An apparatus, as set forth in claim 2, including a cooling means positioned within the second insulated compartment.

4. An apparatus, as set forth in claim 1, wherein the serving tray has lock for releasing the tray for movement from the second to the first position upon receiving signal from remote location.